June 9, 1964     T. G. GRANRYD     3,136,399
VEHICLE PARKING BRAKE
Filed Sept. 13, 1961
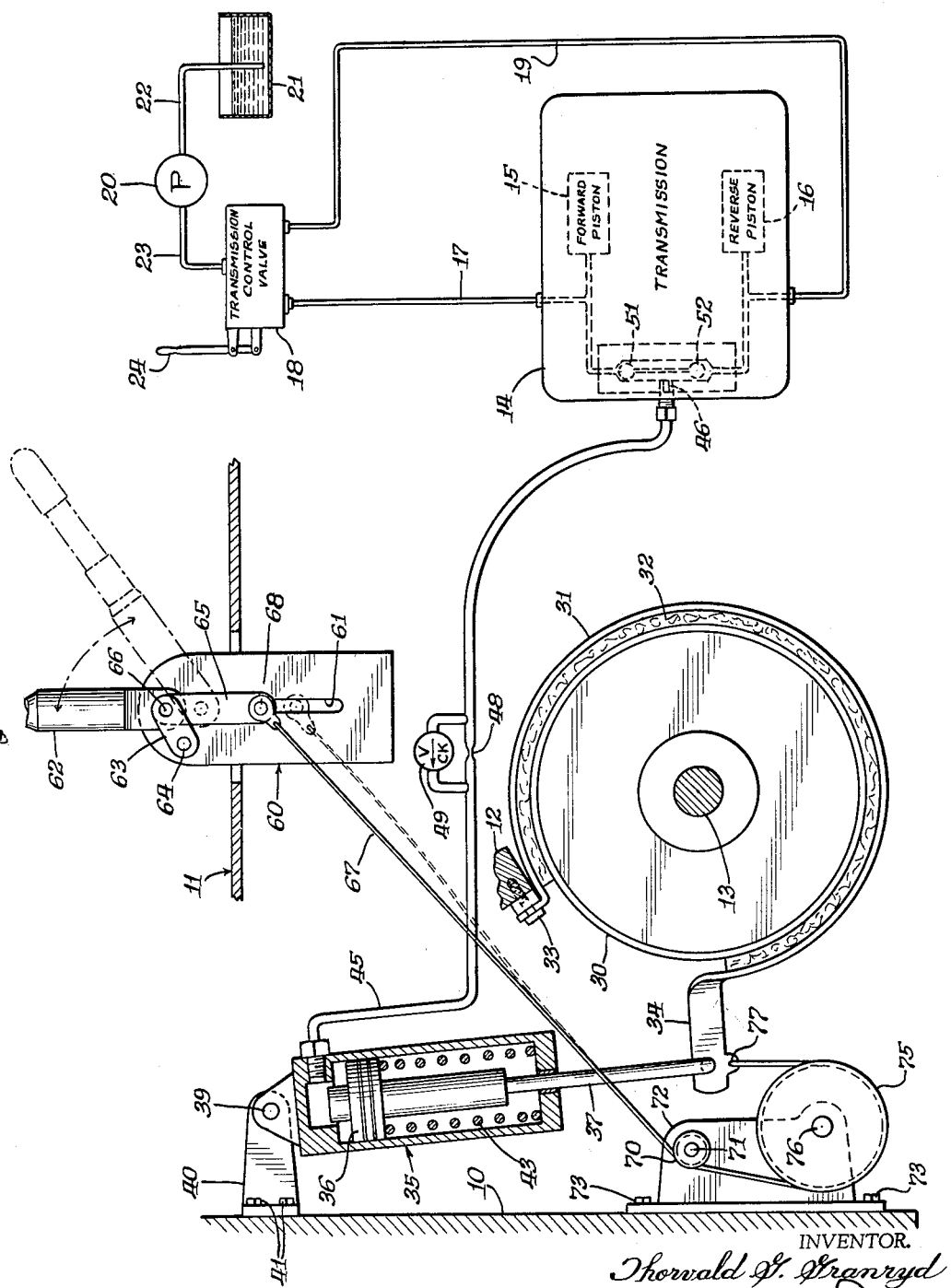
INVENTOR.
Thorvald G. Granryd
BY Paul O. Pippel
Atty.

United States Patent Office 3,136,399
Patented June 9, 1964

3,136,399
VEHICLE PARKING BRAKE
Thorvald G. Granryd, Libertyville, Ill., assignor to The
Frank G. Hough Co., a corporation of Illinois
Filed Sept. 13, 1961, Ser. No. 137,771
5 Claims. (Cl. 192—4)

This invention relates generally to motor vehicle parking brakes, and more particularly to an automatic parking brake for a motor vehicle having a hydraulically controlled transmission.

The primary object of the present invention is to provide a novel parking brake arrangement for a motor vehicle.

A further object is to provide an automatic parking brake for a motor vehicle having a hydraulically controlled transmission with the transmission control system providing means for automatically controlling the parking brake.

It is a further object to provide means in a parking brake arrangement as described above for conveniently manually releasing the automatic parking brake arrangement to permit towing of the vehicle.

Other objects and features of the present invention will be apparent upon a perusal of the following specification and drawing, in which the subject invention is shown partially diagrammatically as applied to a motor vehicle.

The present embodiment is the preferred embodiment, but it is to be understood that changes can be made in the present embodiment by one skilled in the art without departing from the spirit and scope of the present invention.

Generally, the present embodiment contemplates a motor vehicle having a hydraulically controlled transmission for driving the vehicle at various speeds in either the forward or reverse direction, with the vehicle further being provided with a drive or propeller shaft which, when prevented from rotation, will cause the wheels to be stopped and the vehicle thereby braked. A parking brake in the form of a band brake is connected to the drive or propeller shaft of the vehicle and the operating arm of the band brake is connected to the piston rod of a hydraulic cylinder. The hydraulic cylinder is provided with a coiled spring which biases the piston rod to a position wherein the parking brake is operated. A hydraulic fluid conduit is connected to the hydraulic cylinder so that hydraulic fluid under pressure delivered through the conduit to the hydraulic cylinder will oppose the bias of the coiled spring to release the parking brake. The hydraulic fluid conduit is connected into the hydraulically controlled vehicle transmission in such a manner that whenever hydraulic fluid under pressure is delivered to either the forward or reverse direction pistons or actuators of the transmission, hydraulic fluid under pressure is concurrently delivered to the hydraulic conduit to release the parking brake. When the transmission control valve is in a neutral position wherein no hydraulic fluid under pressure is delivered to either the forward or reverse pistons or actuators of the transmission, no hydrulic fluid under pressure is delivered to the conduit connected to the hydraulic cylinder, and the bias of the coiled springs in the cylinder will maintain the parking brake operated.

The invention also includes means for manually releasing the parking brake so that under conditions wherein no hydraulic fluid pressure is available from the transmission control valve, such as when the vehicle is disabled and the hydraulic transmission pump is not operating, the parking brake can be released to permit towing of the vehicle. The manual brake releasing means comprises a lever, cable and pulley arrangement with the lever connected to one end of the cable and with the cable guided over the pulley arrangement to a connection at the other end thereof with the operating arm of the parking brake. Movement of the lever to one position causes the cable to move the parking brake operating arm in a direction opposing the bias of the coiled spring in the brake cylinder to release the parking brake. Movement of the lever to the other operated position thereof renders the cable sufficiently slack to permit the coiled spring in the brake cylinder to move the piston rod and the parking brake operating arm to operate the parking brake.

In detail, the drawing shows only those portions of a motor vehicle which are necessary to understand the present invention, and it is to be understood that the remaining details of the vehicle may be of any suitable type known in the art. Member 10 is a fixed portion of the vehicle such as the frame thereof. The member 11 is also a fixed portion of the motor vehicle and may be some part thereof such as the floor board of the operator's compartment. The member 12 is also a fixed portion of the motor vehicle and may be a part of the frame thereof.

The shaft 13 is the drive or propeller shaft of the motor vehicle and is connected to the wheels of the vehicle so that when the shaft 13 is constrained against rotation, the wheels of the vehicle are also prevented from rotating.

It is further intended that the motor vehicle comprise a hydraulically controlled transmission 14 connected between the engine and wheels of the vehicle for driving the wheels in either the forward or reverse directions at various selective speed ratios. For the present invention, it is necessary that only the forward and reverse pistons 15 and 16 be shown. When hydraulic fluid under pressure is delivered to the forward piston 15, the vehicle is driven in the forward direction and when hydraulic fluid under pressure is delivered to the reverse piston 16, the vehicle is driven in the reverse direction. The forward piston 15 is connected to one end of a hydraulic fluid conduit 17, the other end of which is connected to the transmission control valve 18. The reverse piston 16 is connected to one end of a hydraulic fluid conduit 19, the other end of which is connected to the transmission control valve 18. The transmission control system further includes a hydraulic fluid pump 20 and a hydraulic fluid reservoir 21. The suction side of the hydraulic fluid pump 20 is connected by conduit 22 to the reservoir 21 and the pressure side of the pump 20 is connected by conduit 23 to the transmission control valve 18. The low pressure or hydraulic fluid return lines from the transmission 14 and transmission control valve 18 to the reservoir 21 are not shown, their showing not being necessary to an understanding of the invention. It is believed sufficient to note that normally the hydraulic fluid pump 20 is continuously driven by the engine of the vehicle, and the transmission control valve 18 is of the open center type so that when the operating lever 24 thereof is positioned in a neutral position, fluid from conduit 23 is merely circulated through the valve 18 and back to the reservoir 21. When the lever 24 is operated to the forward direction position, hydraulic fluid under pressure from conduit 23 is directed through the transmission control valve 18 to and through the conduit 17 to the forward piston 15. When the lever 24 is moved to the reverse direction position, the conduit 17 is vented, and hydraulic fluid under pressure from conduit 23 is directed to and through conduit 19 to the reverse piston 16 in the transmission 14.

The parking brake comprises a brake drum 30 which is keyed to the shaft 13. The brake drum 30 is encircled by a brake band 31 which is provided with a brake lining 32 secured about the inner circumference thereof. One end of the brake band 31 is anchored by a bolt 33 secured through the one end of the brake band 31 and into the fixed member 12. The other end of the brake band 31 is bent outwardly to form the brake operating arm 34. It may be seen that when the brake arm 34 is moved toward bolt 33, the brake band 31 is tightened about the brake drum 30 to force the brake lining 32 in tight frictional contact therewith to effectively prevent the brake drum 30 and the shaft 13 from rotating. If the brake arm 34 is moved in the opposite direction, that is away from bolt 33, the brake band 31 is loosened relative to the brake drum 30 and the brake drum 30 and the shaft 13 are free to rotate.

The brake cylinder 35 for the parking brake comprises a cylinder having a piston 36 slidably carried therein. The piston rod 37 is secured to the piston 36 and extends outwardly of the cylinder 35. The end of the piston rod 37 is pivotally connected to the brake arm 34. The head end of the cylinder 35 is pivotally connected by pin means 39 to a bracket 40. The bracket 40 is secured to the fixed member 10 by a fastener 41. A compressed coiled spring 43 is disposed within the cylinder 35 between the piston 36 and the rod end of the cylinder 35. The bias of the coiled spring 43 urges the piston 36 toward the head end of the cylinder 35. The biasing force exerted by the coiled spring 43 is sufficient to draw the brake arm 34 upwardly or toward bolt 33 to a position wherein the shaft 13 is constrained against rotation and consequently the wheels of the vehicle are braked.

The head end of the cylinder 35 is provided with a port to which one end of the hydraulic fluid conduit 45 is connected. The other end of the hydraulic fluid conduit 45 is connected into a passageway 46 in the transmission 14. The conduit 45 is provided intermediate the ends thereof with an orifice 48 and a check valve 49. The check valve 49 is connected in parallel with the orifice 48 and permits the free flow of hydraulic fluid from the transmission to the cylinder 35 to provide for a relatively rapid release of the parking brake. Fluid flowing from the cylinder 35 to the transmission must pass through the orifice 48, and the orifice 48 thereby controls the application time of the parking brake by providing a relatively slow return of fluid to the transmission and a relatively slow operation of the parking brake.

The hydraulic fluid passageway 46 in the transmission 14 is connected in parallel to two interlocked check valves 51 and 52. The other side of the check valve 51 is connected into conduit 17, and the other side of the check valve 52 is connected into conduit 19. The check valves 51 and 52 are interlocked so that alternately one or the other will permit the free flow of hydraulic fluid therethrough and into passageway 46. Thus any hydraulic fluid under pressure in conduit 17 may freely pass through check valve 51, passageway 46, conduit 45 and check valve 49, to the head end of the cylinder 35, or alternately, any hydraulic fluid under pressure in conduit 19 may freely pass through check valve 52, passageway 46, conduit 45 and check valve 49 to the head end of the cylinder 35. When the transmission control valve 18 is in the neutral position, no hydraulic fluid under pressure is supplied to either conduit 17 or conduit 19 and both are vented.

If the transmission control valve 18 is operated to the position for travel of the vehicle in the forward direction, hydraulic fluid from pump 20 is concurrently applied through conduit 17 to the forward piston 15 and the head end of the cylinder 35. The hydraulic fluid under pressure in cylinder 35 will move the piston 36 against the bias of spring 43 to cause the brake arm 34 to be moved to relatively rapidly release the parking brake. If the transmission control valve 18 is operated to the position for travel of the vehicle in the reverse direction, hydraulic fluid pressure is delivered through conduit 19 to the reverse piston 16 and the head end of the cylinder 35. Again, the piston 36 will be moved by the hydraulic fluid under pressure in cylinder 35 against the bias of coiled spring 43 to release the parking brake. When the transmission control valve 18 is moved from either the forward or reverse positions to the neutral position, hydraulic fluid under pressure in either conduit 17 or 19 will be removed and those conduits will be vented. Because the check valves 51 and 52 are interlocked, one being open while the other is closed, hydraulic fluid may pass from conduit 46 to the vent. The orifice 48 will relatively slowly pass fluid from cylinder 35 as the coiled spring 43 urges the piston 36 toward the head end of cylinder 35. The piston rod 37 will move the brake operating arm 34 to operate the parking brake. Thus whenever the operator of the vehicle shifts the transmission control valve 18 to neutral, the parking brake is automatically and relatively slowly applied, and whenever the transmission control valve 18 is shifted to either the forward or reverse direction positions, the parking brake is automatically and relatively rapidly released.

The invention further comprises certain means for manually releasing the parking brake when, for example, the vehicle is disabled and requires towing. The manually releasing means comprises a plate 60 which is secured to the fixed member 11 by any suitable means. The plate 60 is provided with a slot 61 formed therethrough longitudinally thereof. A hand lever 62 is rigidly connected to one end of a lever 63 as a bellcrank. The other end of the lever 63 is pivotally connected to the plate 60 by pin means 64. A link 65 is pivotally connected at one end thereof to the end of the hand lever 62 by pin means 66. The other end of the link 65 is provided with a projection extending through the slot 61 of the plate 60 to confine that end of the link 65 to a sliding movement longitudinally of the slot 61. That end of the link 65 is also connected, as at 68, to one end of a cable 67. When the hand lever 62 is positioned as shown in the solid lines, the cable connection 68 is in its upwardmost position as shown in the drawing. If the hand lever 62 is pivoted in a clockwise direction as viewed in the drawing about the axis of pin means 64, to the dotted line position shown in the drawing, the link 65 will be moved downwardly to carry the cable connecting means 68 to the dotted line position shown in the drawing. The plate 60 must be located relative to the small pulley 70 so that the distance between the small pulley 70 and the cable connecting means 68 is greater when the hand lever 62 is in the solid line position than when the handle 62 is in the dotted line position. In other words, when the hand lever 62 is moved from the solid line position to the dotted line position the cable 67 is slackened. The pulley 70 is rotatively carried on a bracket 72 by pin means 71. The bracket 72 is secured to the fixed member 10 by fasteners 73. The bracket 72 further carries a large pulley 75 which is rotatively carried thereon by pin means 76. The cable 67 is positioned over the small pulley 70 and about the large pulley 75 to a connections, as at 77, with the brake operating arm 34. When the hand lever 62 is in the dotted line position, and the cable 67 is slack, the cable 67 exerts no pull upon the brake arm 34 and the automatic parking brake arrangement previously described may operate. However, when the hand lever 62 is moved from the dotted line position to the solid line position shown in the drawing, the cable 67 is drawn upwardly at the cable connecting means 68 and the other end of the cable at connection 77 is drawn downwardly to move the brake arm 34 to release the parking brake. When the hand lever 62 is in the solid line position of the drawing, the pull on the cable 67 is sufficient to overcome the bias of the coiled spring 43 to draw the piston rod 37 outwardly of the cylinder 35. As long as the hand lever 62 is in the solid line position of the drawing, the parking brake may not be applied and any fluid pressures developed in the cylinder 35 from the transmission 14 will have no effect upon the parking brake.

Having described the invention, what is considered new and desired to be protected by Letters Patent is:

1. An emergency and parking brake system for a motor vehicle having a hydraulic transmission with forward and reverse actuators and control valve means movable from a neutral position for alternately and selectively admitting fluid under pressure to one of said actuators for driving said vehicle in forward and reverse directions comprising, a brake having an operating arm movable to a first position to engage said brake and movable to a second position to release said brake, a cylinder attached to said vehicle, a piston slidable in said cylinder and attached to said arm, bias means acting on said arm for urging the same toward said first position wherein said brake is engaged, and conduit means attached to said cylinder and said transmission for admitting hydraulic fluid under pressure to said cylinder only when said control valve means is moved from said neutral position, said conduit means being attached to said cylinder to permit the fluid to move said piston and said arm against the force of said bias means to said second position, whereby said brake is engaged only when said control valve means is in said neutral position.

2. An emergency and parking brake system according to claim 1 wherein said conduit means has an orifice interposed therein and a check valve connected to said conduit means in parallel with said orifice for permitting full flow therethrough only from said transmission to said cylinder whereby said brake will be quickly released when said control valve means is moved from said neutral position.

3. An emergency and parking brake system according to claim 1 and further comprising disengaging means mounted on said vehicle and operatively connected to said arm for manually disengaging said brake irrespective of the position of said control valve means.

4. An emergency and parking brake system according to claim 3 wherein said disengaging means comprises a cable attached to said arm so that tensioning of said cable will move said arm to said second position, and lever means mounted on said vehicle and attached to said cable, said lever means being movable between a cable relaxing position and a cable tensioning position whereby said brake is released when said lever means is moved to said cable tensioning position.

5. An emergency and parking brake system for a motor vehicle having a hydraulic transmission with forward and reverse actuators and control valve means movable from a neutral position for alternately and selectively admitting fluid under pressure to one of said actuators for driving said vehicle in forward and reverse directions comprising, a brake having an operating arm movable to a first position to engage said brake and movable to a second position to release said brake, a cylinder attached to said vehicle, a piston slidable in said cylinder and attached to said arm, bias means acting on said arm for urging the same toward said first position, conduit means attached to one end of said cylinder so that fluid admitted therein will act on said piston to move said arm against the bias of said bias means to said second position wherein said brake is released, said conduit means being connected to said actuators and having an orifice therein, a check valve connected to said conduit means in parallel with said orifice for permitting full flow of fluid only from said actuators to said cylinder, and check valve means interposed in said conduit means between said orifice and said actuators for admitting fluid pressure to said conduit means whenever said control valve means is moved from neutral position to direct fluid pressure to said actuators whereby said brake is released only when said control valve means is moved from neutral position.

References Cited in the file of this patent

UNITED STATES PATENTS

| | | |
|---|---|---|
| 2,126,849 | Weiss | Aug. 16, 1938 |
| 2,725,129 | Martin | Nov. 29, 1955 |
| 2,766,639 | Rosenberger | Oct. 16, 1956 |
| 2,777,539 | Thorla | Jan. 15, 1957 |
| 2,899,025 | Marosi | Aug. 11, 1959 |
| 2,919,603 | Livermore | Jan. 5, 1960 |